No. 657,718. Patented Sept. 11, 1900.
E. A. WILCOX.
RUBBER PAD HORSESHOE.
(Application filed Aug. 17, 1899.)
(No Model.)
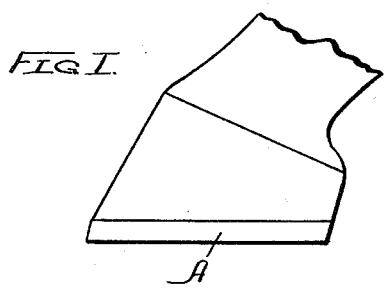
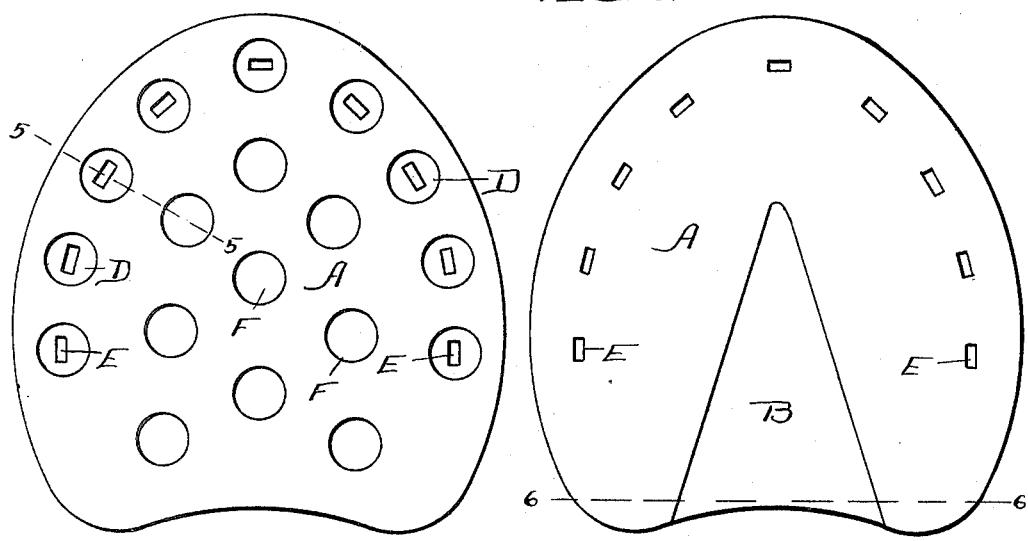
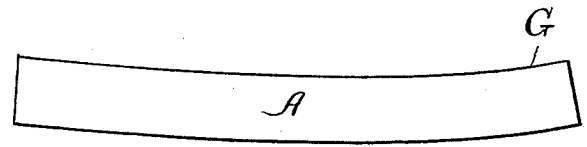
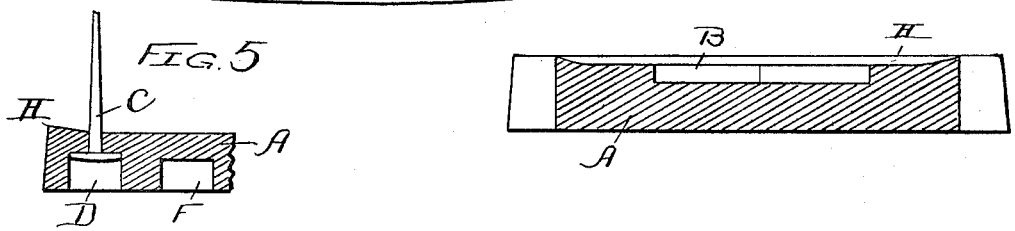
WITNESSES:
Lew. E. Curtis
H. W. Munday
INVENTOR:
ELMER A. WILCOX
By Munday, Evarts & Adcock.
HIS ATTORNEYS.
THE NORRIS PETERS CO., PHOTO-LITHO., WASHINGTON, D. C.

UNITED STATES PATENT OFFICE.

ELMER A. WILCOX, OF DAVENPORT, IOWA.

RUBBER-PAD HORSESHOE.

SPECIFICATION forming part of Letters Patent No. 657,718, dated September 11, 1900.

Application filed August 17, 1899. Serial No. 727,474. (No model.)

*To all whom it may concern:*

Be it known that I, ELMER A. WILCOX, a citizen of the United States, residing in Davenport, in the county of Scott and State of Iowa, have invented a new and useful Improvement in Pads for Horses' Feet, of which the following is a specification.

This invention relates to the construction of pads adapted to be used as substitutes for horseshoes; and its nature will be fully understood from the description thereof given below when considered in connection with the accompanying drawings, in which—

Figure 1 is an elevation of a horse's foot provided with my improved pad. Figs. 2, 3, and 4 are respectively bottom, top, and side views of the pad enlarged from Fig. 1. Figs. 5 and 6 are sectional views on the lines 5 5 and 6 6, respectively.

My improved pad A is preferably made from a good class of rubber, substantially such as is now used in heel-pads for men's shoes. It covers the entire hoof and is recessed at B to give room to the frog. It is secured to the hoof by a series of nails C, driven through the toe and side portions of the pad into the hoof and clenched in the ordinary way. The nails, however, differ from the ordinary nails in that they have broad heads, as clearly shown. To receive the nails, the under surface of the pad is recessed, as shown at D, such recesses extending nearly through the pad and being just large enough to receive the nails C. Above the recesses D are smaller openings E, adapted to permit the entrance of the bodies of the nails. The under surface of the pad is also provided with numerous other recesses F, extending, preferably, about half-way through the pad, and it is expected that these recesses will when the pad is in use become filled with dirt, compacted and hardened by pressure and blows, and that such hardened and compacted dirt will assist in preventing the horse from slipping, especially on wet smooth pavements when the rubber is not effective. Of course the recesses D below the nail-heads will become similarly filled and act in the same way as recesses F.

Around the outer edge of the pad the upper surface is slightly raised, as at H. This is to insure the pad hugging the hoof at the edge so tightly that no dirt can enter between them. The nailing of the pad to the hoof near the raised edge will insure this result. I also prefer that the pad be bent, as seen at G, Fig. 4. The heel is thus caused to incline upward slightly and to keep closer to the hoof back of the nails than it otherwise would.

A pad of the kind set forth does not prevent the natural expansion of the hoof, as does a metal shoe.

While I have described the recesses D and F as being adapted to hold accumulations of dirt, intending thus to distinguish them from mere corrugations or roughnesses commonly employed to prevent rubber shoes from slipping, it will be understood that they will also act as a means of increasing the non-slipping character of the pad by engaging roughnesses of the roads surface much in the same manner as a corrugated pad would engage them.

I claim—

1. As a substitute for a metal horseshoe, a rubber pad covering the bottom of the hoof and secured thereto solely by nails passing through the pad into the hoof, and said pad having its heel curved upward and adapted to be straightened out when applied to the hoof, so that the natural spring in the material will keep the heel closely and securely against the hoof, substantially as specified.

2. As a substitute for a metallic horseshoe, a rubber pad covering the bottom of the hoof and secured thereto solely by nails passing through the pad into the hoof, and said pad having its side edges thickened so as to maintain a close contact with the hoof and thus prevent the entrance of dirt between the hoof and pad, substantially as specified.

ELMER A. WILCOX.

Witnesses:
L. E. CURTIS,
EDW. S. EVARTS.